United States Patent
Ohtake et al.

(10) Patent No.: US 9,342,409 B2
(45) Date of Patent: May 17, 2016

(54) RECORDING MEDIUM STORING TRANSACTION RESUMING PROGRAM, INFORMATION PROCESSING APPARATUS AND TRANSACTION RESUMING METHOD

(71) Applicant: FUJITSU LIMITED, Kawasaki-shi, Kanagawa (JP)

(72) Inventors: Tomohiro Ohtake, Kawasaki (JP); Toshihiro Kodaka, Yokohama (JP); Atsuji Sekiguchi, Kawasaki (JP); Yuuji Hotta, Kawasaki (JP); Toshihiro Shimizu, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 83 days.

(21) Appl. No.: 14/291,949

(22) Filed: May 30, 2014

(65) Prior Publication Data

US 2014/0366026 A1   Dec. 11, 2014

(30) Foreign Application Priority Data

Jun. 6, 2013  (JP) ................... 2013-120250

(51) Int. Cl.
*G06F 11/14* (2006.01)
*H04L 12/931* (2013.01)
*G06F 9/455* (2006.01)

(52) U.S. Cl.
CPC ........ *G06F 11/1464* (2013.01); *G06F 9/45558* (2013.01); *G06F 11/1458* (2013.01); *H04L 49/70* (2013.01); *G06F 2009/45575* (2013.01); *G06F 2201/815* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 2009/0249334 A1 | 10/2009 | Yamaguchi et al. | |
| 2009/0313447 A1 | 12/2009 | Nguyen et al. | |
| 2012/0317566 A1 | 12/2012 | Santos et al. | |
| 2013/0067277 A1 | 3/2013 | Mummidi | |
| 2014/0201564 A1* | 7/2014 | Jagtiani ................ | G06F 11/203 714/4.11 |
| 2014/0310708 A1* | 10/2014 | Lim ...................... | G06F 9/5077 718/1 |
| 2014/0366026 A1* | 12/2014 | Ohtake ............... | G06F 11/1464 718/1 |

FOREIGN PATENT DOCUMENTS

| | | |
|---|---|---|
| JP | 2009-80692 A | 4/2009 |
| JP | 2009-80705 A | 4/2009 |
| JP | 2009-533777 A | 9/2009 |
| JP | 2009-245317 A | 10/2009 |
| JP | 2011-253350 A | 12/2011 |
| WO | 2007/130192 A1 | 11/2007 |

OTHER PUBLICATIONS

Extended European Search Report mailed on Oct. 24, 2014 for corresponding European Patent Application No. 14170643.2, 5 pages.

* cited by examiner

*Primary Examiner* — Benjamin H Elliott, IV
(74) *Attorney, Agent, or Firm* — Fujitsu Patent Center

(57) ABSTRACT

Upon receiving a packet addressed to a virtual machine, a virtual switch connected to the virtual machine forwards the packet to the virtual machine, stores the received packet, the packet being related to an uncompleted transaction in the first storing unit in association with the uncompleted transaction, in response to an instruction for restoring the virtual machine, stops the forwarding of the packet to the virtual machine, and in response to the completion of the restoring of the virtual machine, upon receiving an instruction for resuming the forwarding, transmits one or a plurality of packets stored in the first storing unit in association with the uncompleted transaction to the virtual machine.

15 Claims, 14 Drawing Sheets

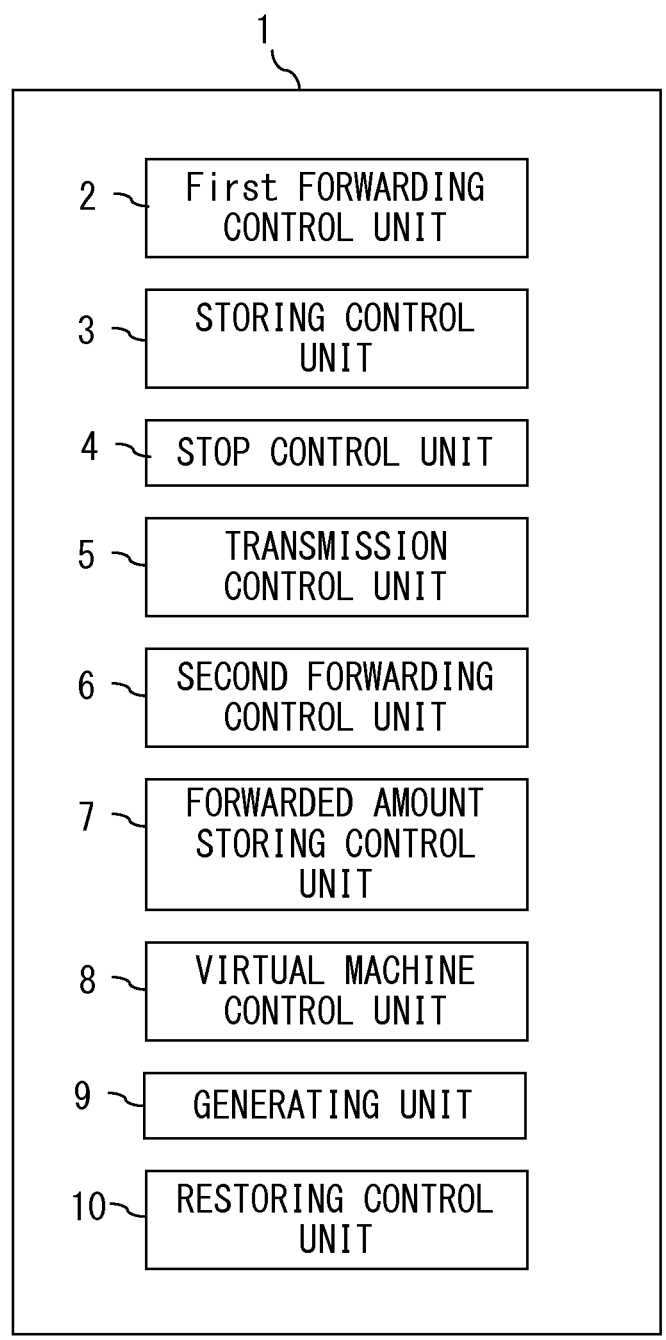
F I G. 1

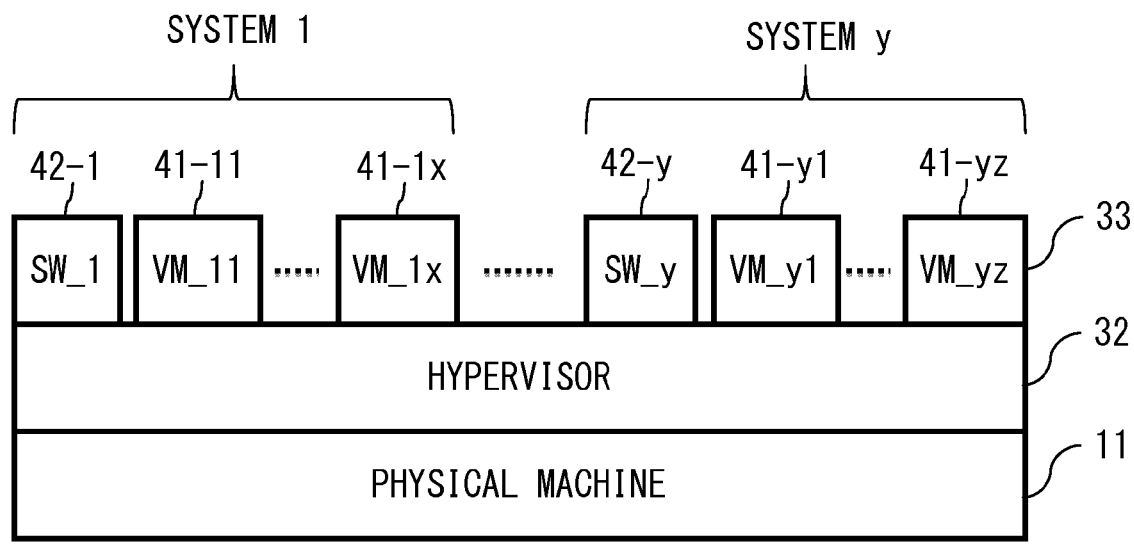
F I G. 3

| REQUEST ID (54-1) | REQUEST (54-2) | TRANSMITTED RESPONSE LENGTH (54-3) | TRANSMISSION SOURCE (54-4) | TRANSMISSION DESTINATION (54-5) |
|---|---|---|---|---|
| 1 | ☐☐☐☐ | 0 | 10.1.1.2 | 192.168.1.2 |
| 2 | ■■■☐☐ | 0 | 10.1.3.4 | 192.168.1.2 |
| 3 | ■■■■■ | 0 | 10.1.5.6 | 192.168.1.2 |
| 4 | ■■■■■ | 123 | 10.1.7.8 | 192.168.1.2 |

54

F I G. 6

|  | 54-1 | 54-2 | 54-3 | 54-4 | 54-5 |
|---|---|---|---|---|---|
|  | REQUEST ID | REQUEST | TRANSMITTED RESPONSE LENGTH | TRANS-MISSION SOURCE | TRANS-MISSION DESTINATION |
|  | 10 | □□□□□□ | 0 | 10.1.1.2 | 192.168.1.2 |
|  | ... | ... | ... | ... | ... |

F I G. 7 A

| REQUEST ID | REQUEST | TRANSMITTED RESPONSE LENGTH | TRANS-MISSION SOURCE | TRANS-MISSION DESTINATION |
|---|---|---|---|---|
| 10 | ■■■□□□ | 0 | 10.1.1.2 | 192.168.1.2 |
| ... | ... | ... | ... | ... |

F I G. 7 B

| REQUEST ID | REQUEST | TRANSMITTED RESPONSE LENGTH | TRANS-MISSION SOURCE | TRANS-MISSION DESTINATION |
|---|---|---|---|---|
| 10 | ■■■■■■ | 0 | 10.1.1.2 | 192.168.1.2 |
| ... | ... | ... | ... | ... |

F I G. 7 C

| REQUEST ID | REQUEST | TRANSMITTED RESPONSE LENGTH | TRANS-MISSION SOURCE | TRANS-MISSION DESTINATION |
|---|---|---|---|---|
| 10 | ■■■■■■ | 123 | 10.1.1.2 | 192.168.1.2 |
| ... | ... | ... | ... | ... |

F I G. 7 D

| SYSTEM SNAPSHOT ID | SYSTEM ID | SNAPSHOT GENERATION DATE/TIME | INDIVIDUAL MACHINE SNAPSHOT |
|---|---|---|---|
| 4 | system1 | 2013/2/4 1:23 | { "vm1" : " snapshot-123", "vm2" : " snapshot-234", "vm3" : " snapshot-456" } |
| 7 | system2 | 2013/3/6 12:34 | { "vm4" : " snapshot-567", "vm5" : " snapshot-789" } |

FIG. 8

| REQUEST ID | REQUEST | TRANSMITTED RESPONSE LENGTH | TRANS-MISSION SOURCE | TRANSMISSION DESTINATION |
|---|---|---|---|---|
| 1 | □□□ | 0 | 10.1.1.2 | 192.168.1.2 |
| 2 | ■(01:02) ■(01:03) ■(01:04) □ | 0 | 10.1.3.4 | 192.168.1.2 |
| 3 | ■(01:01) ■(01:01) ■(01:01) ■(01:02) ■(01:02) | 0 | 10.1.5.6 | 192.168.1.2 |
| 4 | ■(01:01) ■(01:01) ■(01:01) ■(01:01) ■(01:01) | 123 | 10.1.7.8 | 192.168.1.2 |

FIG. 13

RECORDING MEDIUM STORING TRANSACTION RESUMING PROGRAM, INFORMATION PROCESSING APPARATUS AND TRANSACTION RESUMING METHOD

CROSS-REFERENCE TO RELATED APPLICATION

This application is based upon and claims the benefit of priority of the prior Japanese Patent Application No. 2013-120250, filed on Jun. 6, 2013, the entire contents of which are incorporated herein by reference.

FIELD

The present invention relates to a technique to make a transaction resume.

BACKGROUND

When the operator of an information system changes the setting of the system or updates an application, a setting change error, a bug in the new version and the like may cause a trouble in the service. The snapshot of a virtual machine has been used in order to immediately restore the previous condition when such a situation arises.

The restoring using the snapshot of a virtual machine refers to a function with which the condition of the virtual machine is saved, enabling the restoring of the machine to the condition at a later time.

As a first technique, there is a technique with which, when the snapshots of a plurality of virtual computers communicating with each other area are created simultaneously, the technique is performed in a condition maintaining integrity without losing the data being transmitted (for example, Patent document 1). In the first technique, when saving the snapshots of guest OSs (Operating Systems) A, B, saving execution units A, B give instructions to virtual network drivers A, B on the management OS side to stop the storing of data in network transmission queues by the guest OSs A, B, wait until the network transmission queues A, B and network reception queues A, B become empty, and when these queues become empty, outputs snapshot instructions to VM monitors A, B, to make them save the snapshot of the condition of the virtual hardware of the guest OSs A, B.

As a second technique, there is a technique in which a host server hosting one or a plurality of virtual machines backs up the host volume and one or a plurality of virtual machines installed in it by an application integrity method (for example, Patent document 2). In the second technique, the requester of the host level gives an instruction to the writer of the host level to identify which virtual machine is appropriate for application integrity back up. Next, the requester of the host level gives an instruction to the writer of the host level to start virtual machine backup, through the requester of the guest level in each virtual machine configured appropriately. The virtual machine creates an application integrity backup in the virtual machine volume. Next, the requester of the host level starts the snapshot of the server volume on the host level. Therefore, the snapshot of the virtual machine level may be taken out of the snapshot of the host level of the server volume.

As the third technique, there is a technique with which the condition of the virtual computer may be restored to the point of time of the occurrence of a failure, without making the output to the outside of the system wait, regardless of the condition to maintain integrity with the outside (for example, Patent Document 3). In the third technique, a communication recording apparatus records the communication data input/output between the external system and the virtual computer in time series as the communication log. When the restoring of the virtual computer is needed due to an occurrence of a failure, a snapshot management mechanism restores the virtual computer to the point of the time of the capture of the snap shot (a first point of time), based on the latest snapshot of the virtual computer. A log reproduction mechanism inputs, in time series to the virtual computer, the input data from the first time to a second point time that is the time of the occurrence of the failure, to restore the virtual computer to the second point of time.

As a fourth technique, there is a technique with which, when virtual cooperating machines are temporarily stopped, the integrity between the cooperating virtual machines is maintained at the time of resumption (for example, Patent document 4). In the fourth technique, the management server manages physical machines and also manages a plurality of virtual machines deployed on the physical machines, and the execution of the control process is enabled by mutual cooperation between the plurality of virtual machines. The management server includes a dependency list creating unit, a target managing table creating unit, a target presenting unit. The dependency list creating unit creates a dependency list table that manages the dependency of the virtual machines. Upon detecting a selection instruction for the virtual machine being the target of a temporary stop, the target managing table creating unit creates a temporary stop order managing table to manage all the virtual machines that have a dependency with the virtual machine, based on the dependency list table. The target presenting unit presents all the virtual machines being the temporary stop target in descending order of dependency, based on the temporary stop order managing table.

As the fifth technique, when a failure occurs in a physical computer on which a virtual machine is running, the service is continued by a virtual machine re-generated or re-started on another physical computer (for example, Patent document 5). In the fifth technique, when a failure occurs in a server computer on which a virtual machine is running, the virtual machine monitor of the server computer re-generates the virtual machine as a virtual machine on the server computer, based on a snapshot obtained on a disk apparatus at the nearest point of time to the time of the occurrence of the failure. The condition reproducing unit of the communication recording unit makes the virtual machine reproduce the condition of the virtual machine in the period from the time in which the snapshot was obtained to the time of the occurrence of the failure, based on the communication history associated with the virtual machine. The re-starting unit re-starts the virtual machine on the server computer, in the case of a failure in reproducing the condition of the virtual machine, for example.

Patent document 1: Japanese Laid-open Patent Publication No. 2011-253350

Patent document 2: Japanese National Publication of International Patent No. 2009-533777

Patent document 3: Japanese Laid-open Patent Publication No. 2009-80705

Patent document 4: Japanese Laid-open Patent Publication No. 2009-245317

Patent document 5: Japanese Laid-open Patent Publication No. 2009-80692

SUMMARY

A computer-readable recording medium has stored therein a program for causing a computer to execute a process for resuming a transaction. The process includes: making a virtual switch connected to a virtual machine forward a packet to the virtual machine when the packet addressed to the virtual machine is received; making the virtual switch store the received packet, the packet being related to an uncompleted transaction, in a first storing unit in association with the uncompleted transaction; making the virtual switch stop forwarding of the packet to the virtual machine in response to an instruction for restoring the virtual machine; and making the virtual switch transmit one or a plurality of packets stored in the first storing unit in association with the uncompleted transaction to the virtual machine when an instruction to resume the forwarding in response to an completion of restoring of the virtual machine is received.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a block diagram of an information processing apparatus in the embodiment.

FIG. 3 illustrates an example of a configuration of a physical machine that operates a plurality of virtual machines in the embodiment.

FIG. 6 illustrates an example of a request retransmission table in the embodiment.

FIGS. 7A-7D illustrate an example of the transition of the statuses of a row of the request retransmission table in the embodiment.

FIG. 8 illustrates an example of a snapshot managing table in the embodiment.

FIG. 13 illustrates an example of a request transmission table in a variation example of the embodiment.

DESCRIPTION OF EMBODIMENTS

Figure 2:
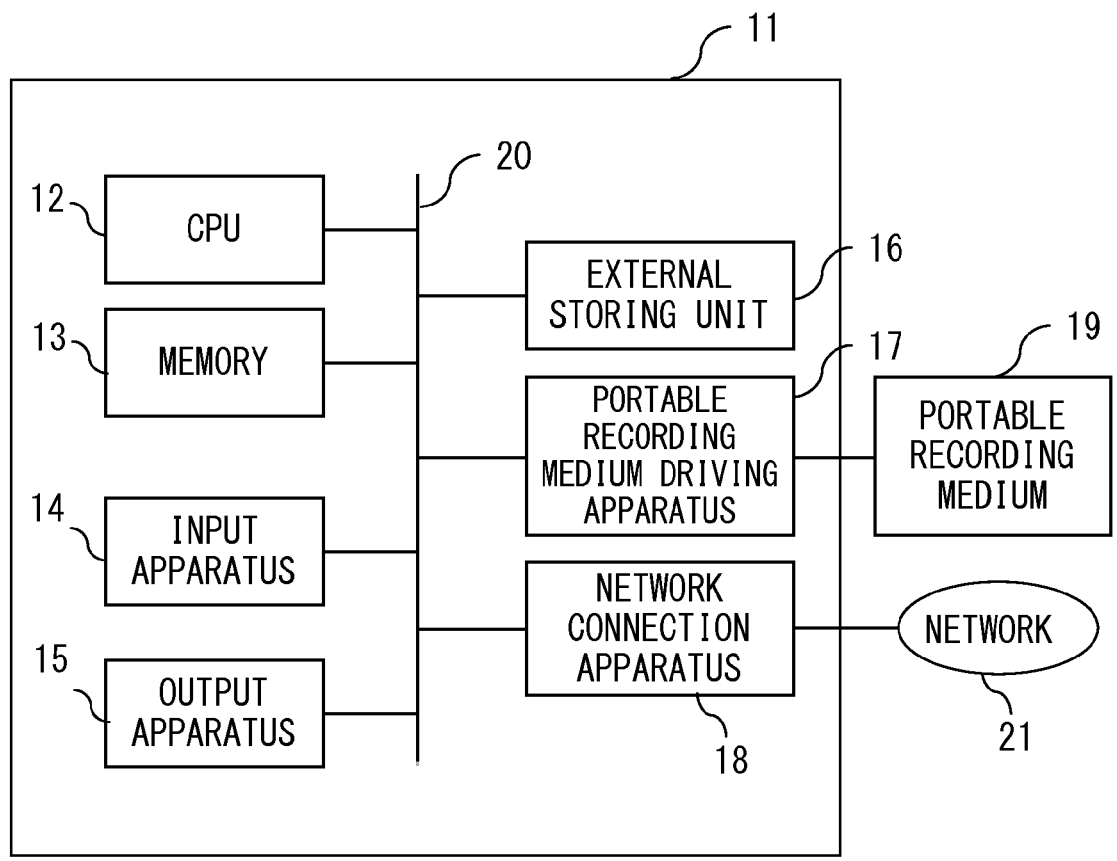
FIG. 2 is a hardware configuration diagram of a physical machine in the embodiment.

However, by the first technique, when restoring the snapshot, the restoring is done to the connection information at the time of the generation of the snapshot, and therefore, an established connection at the time of restoring is not maintained, and from the viewpoint of the client, it looks as if the connection has been cut off.

The present invention provides, as an aspect, a technique with which, even when an uncompleted transaction exists, the transaction may be resumed after the completion of the restoring of a virtual machine.

While is it possible to obtain a snapshot for an individual virtual machine, it is not easy to obtain a snapshot at a system level for a system that runs across virtual machines. The reasons for it include that there is no guarantee that snapshots may be obtained at the same timing between the machines in the system, and that the condition of the network in the system is not saved.

However, as the current information systems have been sophisticated, the system is not contained with a single machine only, in many cases. For that reason, for the snapshot of the virtual machine, there is a need to obtain the snapshot of the entire system.

In the first technique, by generating the snapshot after stopping the network communication by controlling the network driver in the plurality of virtual machines, a snapshot with integrity across a plurality of machines is generated. However, in the first technique, no consideration is given to the integrity between the snapshot-target machines and others, making it difficult to be used in a system conducting an actual operation. Specifically, no consideration is given to a client in an external network, assuming the inside of a closed system only, and no consideration is given to the disk for data, causing the loss of data changes at the time of the restoring the snapshot. In addition, when restoring the snapshot, the restoring is done to the connection information at the time of the generation of the snapshot, and therefore, a connection existing at the time of restoring is not maintained, and from the viewpoint of the client, it looks as if the connection has been cut off.

In the second technique, the host server gives an instruction to the virtual machine, so that a snapshot with integrity of virtual machines can be generated without stopping the virtual machines. A snapshot with integrity at an application level is generated by using a shadow copy of NTFS. However, the second technique is relevant to the snapshot to the individual machine, and integrity between a plurality of machines may not be maintained.

In the third technique, all the communications from the generation to the restoring of a snapshot are saved, and by inputting the saved communications after restoring to the snapshot, data changes after the generation of the snapshot may be handled. Since the communications from the point of time of the generation of the snapshot are reproduced in the third technique, the restoring takes time according to the time since the generation of the snapshot.

In the fifth technique, the shutdown of the virtual machine and the physical machine is performed using the dependency of the virtual machines, but the system is stopped and the snapshot may not be obtained while keeping the service continued.

Then, the present embodiment provides a technique with which, even when an uncompleted transaction exists, the transaction may be resumed after the completion of the restoring of a virtual machine. Furthermore, the present embodiment provides a technique with which the restoring of a snapshot for the entirety of a virtual system including a plurality of virtual machines may be performed without stopping the service. Furthermore, the present invention provides a technique with which data updates done between the generation of a snapshot and the restoring may be maintained even after the restoring and the time taken for the restoring is shortened.

FIG. 1 is a block diagram of an information processing apparatus in the present embodiment. An information processing apparatus 1 includes a first forwarding control unit 2, a storing control unit 3, a stop control unit 4, a transmission control unit 5.

When a virtual switch connected to a virtual machine receives a packet addressed to the virtual machine, the first forwarding control unit 2 makes the virtual switch forward the packet. One of the examples of the first forwarding control unit 2 is a hypervisor 32.

The storing control unit 3 makes the virtual switch store a received packet that relates to an uncompleted transaction in a first storing unit in association with the uncompleted transaction. One of the examples of the storing control unit 3 is the hypervisor 32. One of the examples of the first storing unit is an external storing unit 16 in which a request retransmission table is stored.

The stop control unit 4 makes the virtual switch stop the packet forwarding to the virtual machine, in response to an instruction to restore the virtual machine. One of the examples of the stop control unit 4 is a hypervisor 32.

According to the completion of the restoring of the virtual machine, when an instruction for resuming the forwarding is received, the transmission control unit 5 makes the virtual switch transmit, to the virtual machine, one or a plurality of packets stored in the first storing unit in association with the uncompleted transaction.

By making the configuration as described above, even when an uncompleted transaction exists, the transaction may be resumed after the completion of the restoring of the virtual machine.

When storing a packet in the first storing unit in association with an uncompleted transaction, the storing control unit 3 attaches the time of reception or the time of forwarding of the packet.

By making the configuration as described above, the order of retransmitted packets may be defined.

The information processing apparatus 1 further includes a second forwarding control unit 6, a forward amount storing control unit 7. When the virtual switch receives a packet regarding a response to a request to the virtual machine formed by a packet, the second forwarding control unit 6 makes the virtual switch forward the packet regarding the response. One of the examples of the second forwarding control unit 6 is the hypervisor 32.

The forward amount storing control unit 7 makes the virtual switch store, in the first storing unit, the forward amount of the packet regarding the response. One of the examples of the forward amount storing control unit 7 is the hypervisor 32.

According to the completion of the restoring of the virtual machine, when an instruction for resuming the forwarding is received and further when a packet regarding the response is received from the virtual machine, the second forwarding control unit 6 further makes the virtual switch perform the following process. That is, the second forwarding control unit 6 makes the virtual switch discard one or more packets that are stored in the first storing unit and that are corresponding to the forward amount, and makes it forward one or more packets that have exceeded the forward amount.

By making the configuration as described above, without sending the packets that have already been sent to the client, only the unsent packets may be sent.

The information processing apparatus 1 further includes a virtual machine control unit 8 and a generating unit 9. The virtual machine control unit 8 makes the virtual machine stop transmission of the packet regarding the response, and makes it write write-in information stored temporarily in a storing area before the write-in into a second storing unit corresponding to a storing area used by the virtual machine, into the second storing unit.

The generating unit 9 generates a snapshot of the virtual machine, after the stop of the forwarding of the packet regarding the request from the virtual switch to the virtual machine, the stop of the transmission of the packet regarding the response from the virtual machine, and the write-in of the write-in information. One of the examples of the generating unit 9 is the hypervisor 32.

By making the configuration as described above, the snapshot may be generated without stopping the virtual system, making it possible to generate the snapshot while keeping the service by the virtual system continued. In addition, the write-in information kept temporarily in the storing area is written into the second storing unit, without making the second storing unit the target of the snapshot, making it possible to shorten the snapshot generating time and the time with the restoring using the snapshot.

The information processing apparatus further includes a restoring control unit 10. The restoring control unit 10 restores a virtual machine corresponding to the snapshot. At this time, when, after the generation of the snapshot, the transmission of the packet regarding the request and the packet regarding the response that had been stopped has resumed, the virtual machine control unit 8 performs the following process. That is, the virtual machine control unit 8 makes the virtual machine corresponding to the snapshot stop the process being executed, and makes the virtual machine write the write-information kept temporarily in the storing area into the second storing unit.

After the stop of the process being executed by the virtual machine, the stop of the forwarding of the packet regarding the request from the virtual switch to the virtual machine, and the write-in of the write-in information, using the snapshot, the restoring control unit 10 restores the virtual machine corresponding to the snapshot.

The virtual machine control unit 8 further makes the restored virtual machine discard read-out information read out from the second storing unit and kept temporarily.

The virtual machine control unit 8 makes the transmission of the packet regarding the response that had been stopped at the time of generating the snapshot resumed. The virtual machine control unit 8 stops the process that was being executed at the time of the generation of the snapshot.

By making the configuration as described above, data updates done between the generation of a snapshot and the restoring may be maintained even after the restoring.

FIG. 2 is a hardware configuration diagram of a physical machine in the embodiment. A physical machine 11 includes a Central Processing Unit (CPU) 12, a memory 13, an input apparatus 14, an output apparatus 15, an external storing unit 16, a portable recording medium driving apparatus 17, a network connection apparatus 18, and a bus 20. The bus 20 has connected thereto the CPU 12, the memory 13, the input apparatus 14, the output apparatus 15, the external storing unit 16, the portable recording medium driving apparatus 17, the network connection apparatus 18.

The memory 13 is a storing apparatus such as a ROM (Read Only Memory), a RAM (Random Access Memory), and the like. The external storing unit 16 is a storing apparatus with a larger capacity compared with the memory 13. As the external storing unit 16, a storing apparatus in various formats such as a hard disk drive, a flash memory apparatus, a magnetic apparatus and the like may be used.

The CPU (physical CPU) 12 reads out a program that realizes the process described later stored in the ROM or the external storing unit 16, and executes the program.

The portable recording medium driving apparatus 17 is an apparatus to read out a portable recording medium 19. As the portable recording medium 19, a recording medium in various formats such as a CD-ROM, a flexible disk, an optical disk, an magneto-optical disk, an IC card, a DVD, a USB memory apparatus, and the like may be used.

The network connection apparatus 18 is an interface card to communicate with another information processing apparatus connected to a network 21. The network 21 may be a communication network such as the Internet, LAN, WAN, a dedicated line, wired network, wireless network, and the like.

For the input apparatus 14, a keyboard, a mouse, a digital camera, a web camera, a microphone, a scanner, a sensor, a tablet, a touch panel and the like may be used. Meanwhile, for the output apparatus 15, a display, a printer, a speaker and the like may be used.

The program that realizes the process explained in the embodiment described later may be stored in the external storing unit 16, for example, via the communication network 21, and the network connection apparatus 18. Meanwhile, the program that realizes the process explained in the embodiment described later may also be stored in a commercially-sold and distributed portable recording medium. In this case, the portable recording medium may be set in the portable recording medium driving apparatus 17, and the program may be read out and executed by the CPU 12.

FIG. 3 illustrates an example of the configuration of a physical machine that operates a plurality of virtual machines in the present embodiment. In the physical machine 11, the hypervisor 32 is installed, and on the hypervisor 32, a plurality of virtual switches 42-1, 42-$y$ and a plurality of virtual machines 41-11 through 41-1$x$, . . . 41-$y$1 through 41-$yz$ are operating. The logical set of the virtual switches and the virtual machine is referred to as a system. In addition, the plurality of virtual machines 41-11 through 41-1$x$ . . . 41-$y$1 through 41-$yz$ are collectively referred to as the virtual machine 41. The plurality of virtual switches 42-1, 42-$y$ are collectively referred to as the virtual switch 42.

The physical machine 11 functions as a plurality of virtual machines (VM) by executing the hypervisor 32. The physical machine 11 is, as explained in FIG. 2, a group of physical devices including the CPU 12, the memory 13 and the like.

On the physical machine 11, the hypervisor 32 and the plurality of virtual systems 1 through y are operating. Each virtual system includes the virtual switch 42 and the plurality of virtual machines 41. For example, the virtual system 1 includes a virtual switch SW_1, virtual machines VM_11, . . . , and virtual machine VM_1$x$. The virtual system y includes a virtual switch SW_y and virtual machines VM_y1 . . . VM_yz.

The hypervisor 32 is a program that provides a virtual hardware environment to the virtual switch 42, the virtual machines 41 for operating and controlling the virtual switch 42 and the plurality of virtual machines 41 on the physical machine 11. Specifically, the hypervisor 32 performs the dispatch of the operating systems (OS) of the respective virtual machines 41 (assignment of controlling right of the actual CPU), the emulation of the privileged instruction executed by the OSs, the control of the hardware such as the physical CPU 12, and the like.

Each of the virtual machines 41 is a virtual computer that operates independently from other virtual machines 41. Each of the virtual machines 41 is realized with the OS thereof obtaining the control right of the physical CPU 12 via the hypervisor 32 and being executed on the CPU 12.

Upon receiving a transmitted communication packet (hereinafter, referred to as a "packet") via a network connected to the physical machine 11, the virtual switch 42 refers to the destination of the packet and forwards the packet to the virtual machine indicated by the destination. Meanwhile, upon receiving a packet from one of the virtual machines in the physical machine, the virtual switch 42 refers to the destination of the communication packet, and forwards the packet to another virtual machine, another physical machine in the physical machine, or a virtual machine in another machine, indicated by the destination. Here, a message such as a request message (hereinafter, referred to as a "request"), a response message (hereinafter, referred to as a "response") and the like are broken down into a prescribed size, and the broken-down data to which is attached a header corresponding to a prescribed communication protocol is referred to as a packet.

Figure 4:
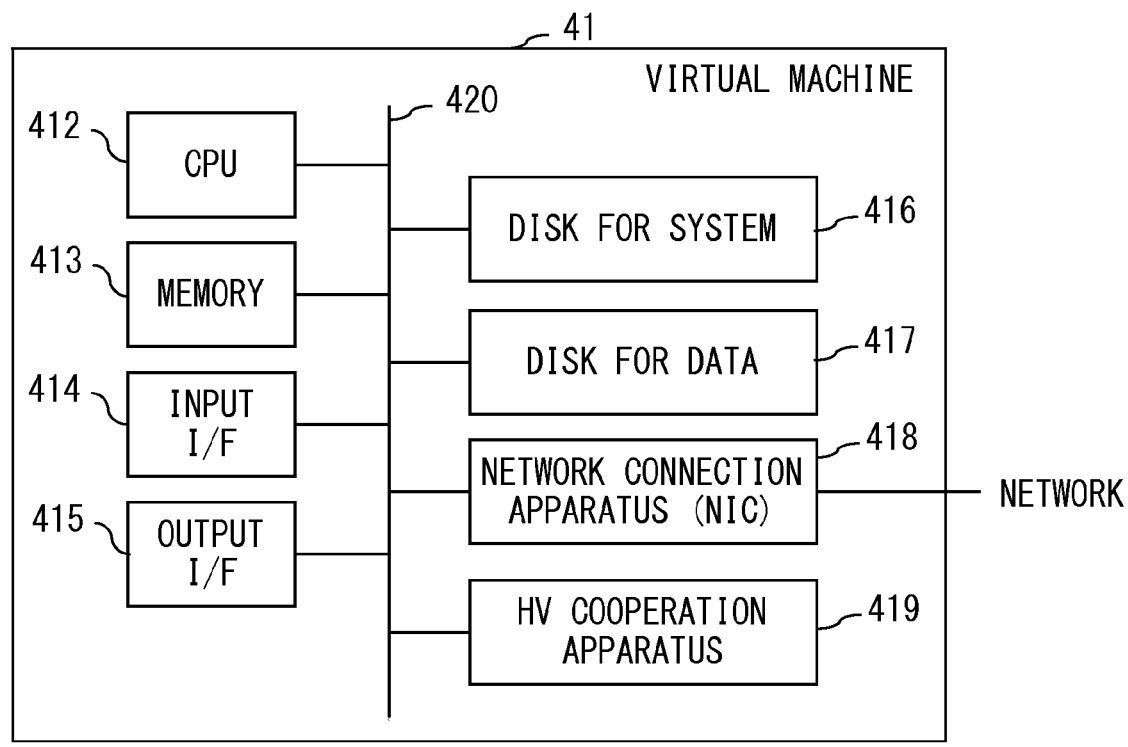
FIG. 4 is a logical configuration diagram of a virtual machine in the embodiment.

FIG. 4 is a logical configuration diagram of a virtual machine in the present embodiment. The virtual machine 41 includes logical (virtual) devices such as a CPU 412, a memory 413, an input apparatus 414, an output apparatus 415, a disk for system 416, a disk for data 417, a network connection apparatus 418, a hypervisor cooperation apparatus 419, a bus 420, and the like.

The CPU 412 is a logical CPU that reads out a program that realizes a process described later stored in the disk for system 416 and the like, and executes the program. The memory 413 is a logical storing apparatus that temporarily keeps the program used by the CPU 412 and keeps data.

The input apparatus 414 is a logical input apparatus that inputs data to the virtual machine 41. Meanwhile, the output apparatus 415 is a logical output apparatus used by the virtual machine 41.

In the disk for system 416, the OS, the application, the setting file and the like are stored. In the disk for data 417, data saved by the application software are stored. Both the disk for system 416 and the disk for data 417 are implemented by a file on the external storing unit 16 of the physical machine 11 in many cases.

The network connection apparatus 418 is a logical network interface card (NIC) for communicating with another physical machine or virtual machine through a network. The network may be a communication network such as the Internet, LAN, WAN, a dedicated line, wired network, wireless network, and the like.

The hypervisor cooperation apparatus (hereinafter, referred to as an HV cooperation apparatus) 419 is a virtual device for the hypervisor 32 and the OS of the virtual machine 41 to cooperate. Using the HV cooperation apparatus 419, the hypervisor 32 and the OS of the virtual machine 41 may cooperate. In addition, the HV cooperation apparatus 419 enables the power management of the virtual machine 41, the sharing of the clipboard, and the like.

Figure 5:
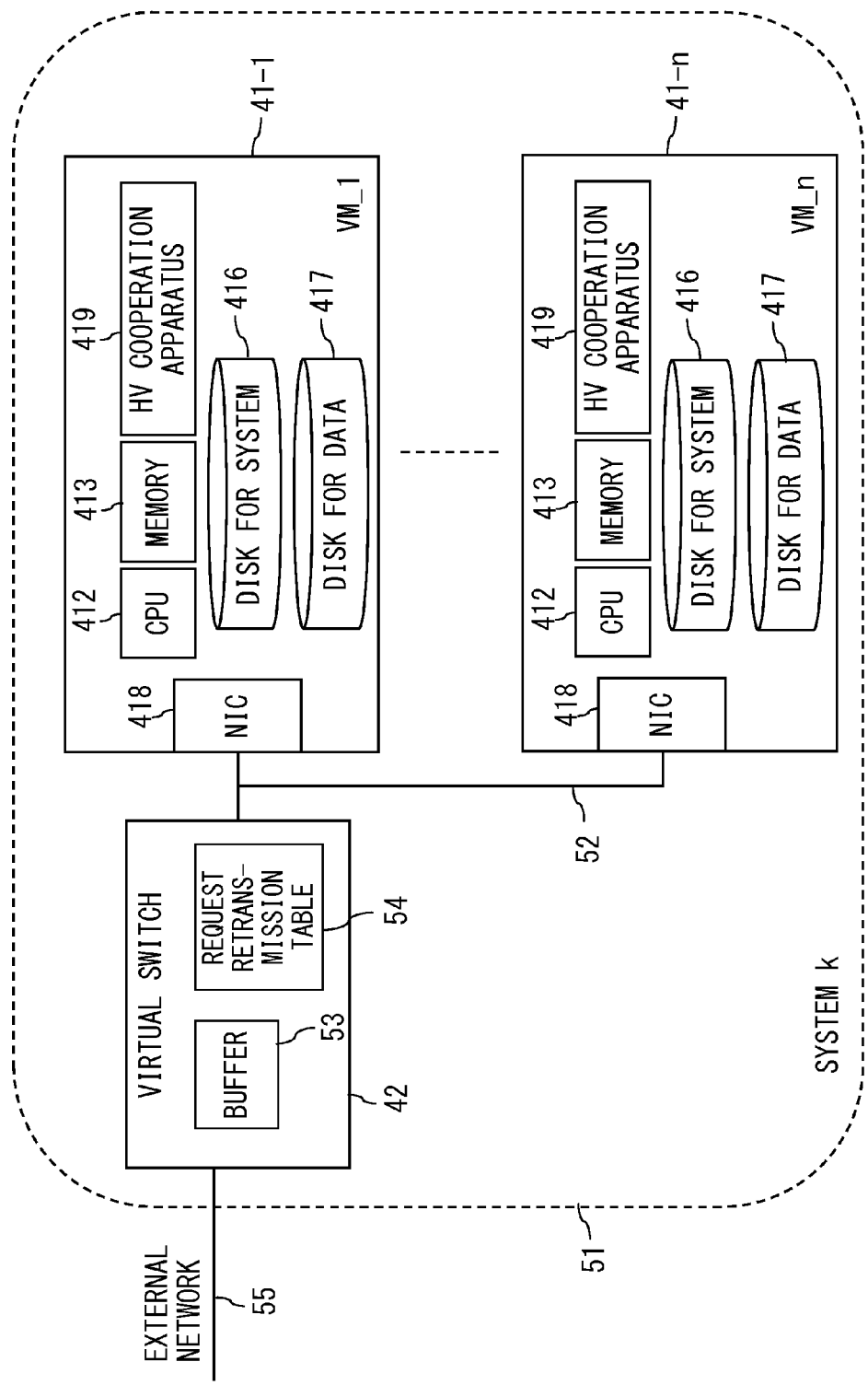
FIG. 5 is a logical configuration diagram of a virtual system in the embodiment.

FIG. 5 is a logical configuration diagram of a virtual system of the present embodiment. A virtual system 51 is one of the virtual systems operating on the hypervisor 32. In the virtual system 51, a plurality of virtual machines 41 (VM_1 through VM_n) are linked by an internal network 52. In addition, the virtual system 51 includes a virtual switch 42 that connects the internal network 52 and an external network 55.

For example, in the case of a two-layer system in which the virtual server VM_1 (41-1) is an application server and the virtual server VM_n (41-$n$) is a database server, the virtual system 51 conducts the following actions. A request issued by a client apparatus (hereinafter, referred to as a "client") from the external network 55 goes through the virtual switch 42 and is transmitted to the virtual machine VM_1 via the internal network 52. The virtual machine VM_1 makes an inquiry to the database of the virtual machine VM_n via the internal network 52, and sends back a response to the client via the virtual switch 42.

In this embodiment, by adding a mechanism to control the reception buffer of the virtual machine 41 and the write buffer of the disk for data 417 through the HV cooperation apparatus 419, it is made possible to generate a consistent snapshot across a plurality of virtual machines 41. In addition, in the restoring based on the snapshot, the virtual machine 41 is made to stop the request being executed, through the HV cooperation apparatus 419, and the request being executed is sent again from the virtual switch 42. Accordingly, it becomes possible to make the request look as if it was continuing from the viewpoint of the client, even at the time of the snapshot restoring.

The virtual switch 42 has a buffer 53 to store the request being executed and transmitted from the external network. The virtual switch 42 keeps storing the content of the request from the outside in the buffer 53 until the response to the request is completed. The buffer 53 is used at the time of the restoring of the snapshot. Meanwhile, in the logical memory area of the virtual switch 42, a request retransmission table 54 is stored.

FIG. 6 illustrates an example of a request retransmission table in the present embodiment. FIGS. 7A-7D illustrate an example of the transition of the statuses of a row of the request retransmission table in the present embodiment. The request retransmission table 54 includes data items "REQUEST ID" 54-1, "REQUEST" 54-2, "TRANSMITTED RESPONSE LENGTH" 54-3, "TRANSMISSION SOURCE" 54-4, "TRANSMISSION DESTINATION" 54-5.

The "REQUEST ID" 54-1 is identification information for identifying the received request, and in the example in FIG. 6, identification numbers are assigned in ascending order in the order of the added row. In the "REQUEST" 54-2, the byte string of the body of the received request is recorded. Here, the request body represents the body (the part other than the header) of a request message. The request message (request body) is broken down into packets and transmitted, and the virtual switch 42 sequentially receives the respective broken-down data and stores them in the buffer, and the unit of the data stored in the buffer is referred to as the byte string of the body of the request. The "TRANSMITTED RESPONSE LENGTH" 54-3 stores the response length (bytes) that has already been transmitted, regarding the response corresponding to the request. In the "TRANSMISSION SOURCE" 54-4, the address of the transmission source that transmitted the request is stored. In the "TRANSMISSION DESTINATION" 54-5, the address of the transmission destination of the request is stored. The details of FIGS. 7A-7D are explained in FIG. 9.

FIG. 8 illustrates an example of a snapshot managing table in the present embodiment. The snapshot managing table 61 is stored in a storing apparatus managed by a hypervisor. The snapshot managing table 61 includes data items "SYSTEM SNAPSHOT ID" 61-1, "SYSTEM ID" 61-2, "SNAPSHOT GENERATION DATE/TIME" 61-3, "INDIVIDUAL MACHINE SNAPSHOT" 61-4.

In the "SYSTEM SNAPSHOT ID" 61-1, identification information to identify the snapshot of each virtual system is stored. In the "SYSTEM ID" 61-2, identification information to identify the virtual system for which the snapshot has been generated is stored. In the "SNAPSHOT GENERATION DATE/TIME" 61-3, the date/time on which the snapshot is generated is stored. In the "INDIVIDUAL MACHINE SNAPSHOT" 61-4, among the virtual machines included in the virtual system identified by the system ID, the name of the virtual machine for which the snapshot has been created and the snapshot name are stored. In FIG. 8, in the case of the virtual system of SYSTEM ID=1, snapshots of the virtual machines identified by the virtual machine names "vm1", "vm2", "vm2" have been generated. Specifically, the snapshot of the virtual machine "vm1" is "snapshot-123". The snapshot of the virtual machine "vm2" is "snapshot-234". The snapshot of the virtual machine "vm3" is "snapshot-456".

Figure 9:
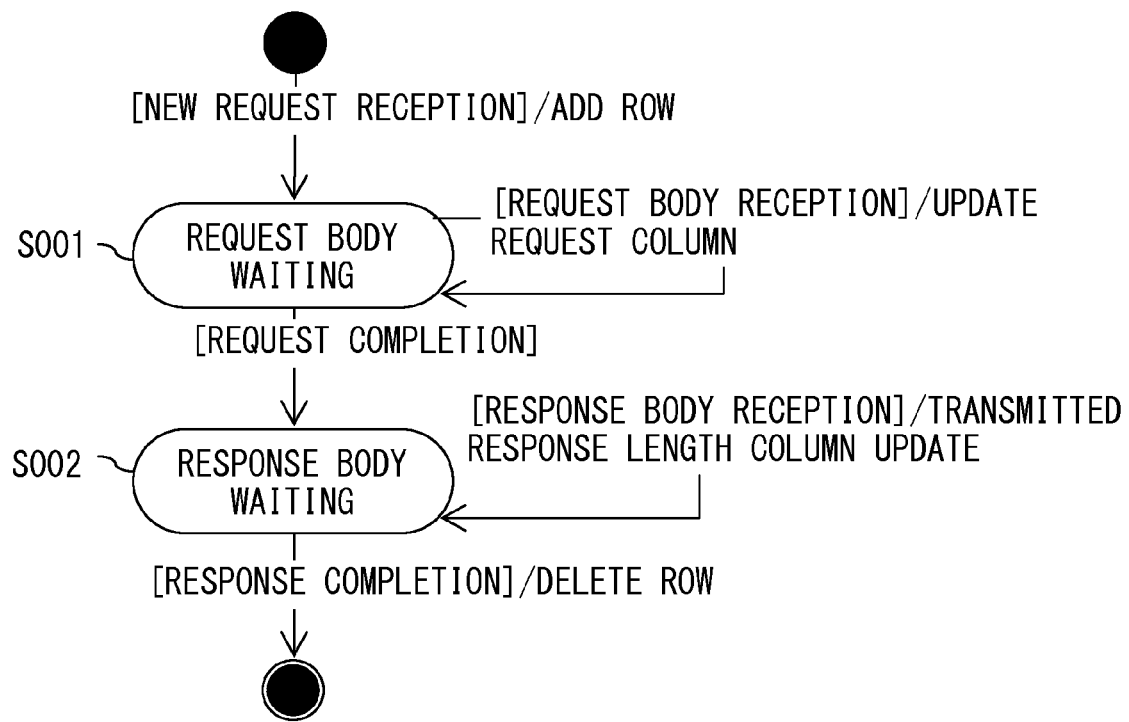
FIG. 9 is an activity diagram illustrating an example of the action at the time of request/response reception of a virtual switch in the embodiment.

FIG. 9 is an activity diagram illustrating an example of the action at the time of request/response reception of a virtual switch in the embodiment. The activity diagram is made as a diagram in which a status is given to each individual request/response. With reference to FIGS. 7A-7D, FIG. 9 is explained.

When a packet regarding a new request arrives from a client through an external network 55, the virtual switch 42 adds a new row. In FIG. 7A, the row indicated by REQUEST ID=10 is an example of the added row. The virtual switch 42 refers to the header information of the packet of the new request, and registers the transmission source address, the transmission destination address in the "TRANSMISSION SOURCE" 54-4, "TRANSMISSION DESTINATION" 54-5 of the added row, respectively.

Meanwhile, at the time of the start of the reception of the new request, the request body has not arrived, and therefore, the "REQUEST" 54-2 of the request retransmission table 54 is empty. In addition, at this point in time, the packet regarding the response has not been sent back either, and therefore, the "TRANSMITTED RESPONSE LENGTH" is also "0". It is assumed that the white square in the "REQUEST" 54-2 represents the request body that has not been received yet, and the black square represents the request body that has already been received. Meanwhile, the examples in FIG. 6 and FIGS. 7A-7D illustrate an example in which the size of the request body to be received is known in advance, but this is for the convenience of explanation, and without being limited to this, the size of the request body to receive may be unknown in advance. In this case, the virtual switch 42 analyzes the packet that has the last data of the request body.

When, in the status of waiting for the request body, a packet including the request body of the request is received, the virtual switch 42 forwards the packet including the request body to the virtual machine according to the destination of the request, and also performs the following process. That is, the virtual switch 42 adds the request body to the value of the "REQUEST" 54-2" of the row corresponding to the received request in the request retransmission table 54 (S001). An example of the row at this time is the row indicated by REQUEST ID=10 in FIG. 7B. In the "REQUEST" 54-2", as represented by the black square, the request body that has already been received is recorded. Meanwhile, at this time, the value of the "TRANSMITTED RESPONSE LENGTH" 54-3 is "0".

When the transmission of the request by the client is completed, the status of the virtual switch 42 with respect to the request/response changes from waiting for the request body to waiting for the response body (S002). An example of the row at this time is the row indicated by REQUEST ID=10 in FIG. 7C.

When receiving a packet including the response body to the request body registered above from the virtual machine 41 in the internal network 52, the virtual switch 42 forwards the packet including the response body according to the destination of the response. Together with that, the virtual switch 42 transmits the packet including the response body to the client of the external network 55, and records the byte count of the transmitted response body as the value of the "TRANSMITTED RESPONSE LENGTH" 54-3 in the request retransmission table 54. An example of the row at this time is the row indicated by REQUEST ID=10 in FIG. 7D. Here, the response body represents the body (the part other than the header) of a response message.

Meanwhile, as an example to determine whether the received response is a response to the request body registered in S001, the following may be considered. For example, when the transmission source of the header of the response matches the "TRANSMISSION DESTINATION" 54-5 and the transmission destination of the header of the response matches the "TRANSMISSION SOURCE" 54-4, a determination as the response to the request body may be considered. In addition, in S001, at the time of the forwarding to the virtual machine, a request ID may be attached to the header of the request message (or the packet) and encapsulation may be performed. In this case, upon receiving the encapsulated request, the virtual machine 41 performs processing for the request, attaches the request ID to the header (or the packet) of the processing result (response), performs encapsulation, and transmits it to the virtual switch 42. Upon receiving the packet of the received response, the virtual switch 42 searches for the row that matches the request ID attached to the received response (or the packet of it) from the request retransmission table 54. When the row that matches the attached request ID is retrieved, the virtual switch 42 updates the value of the "TRANSMITTED RESPONSE LENGTH" 54-3.

When the transmission of the packet regarding the response to the request is completed, the virtual switch 42 deletes the row corresponding to the transmitted response from the request retransmission table 54, and terminates the status transition corresponding to the request/response.

Figure 10:
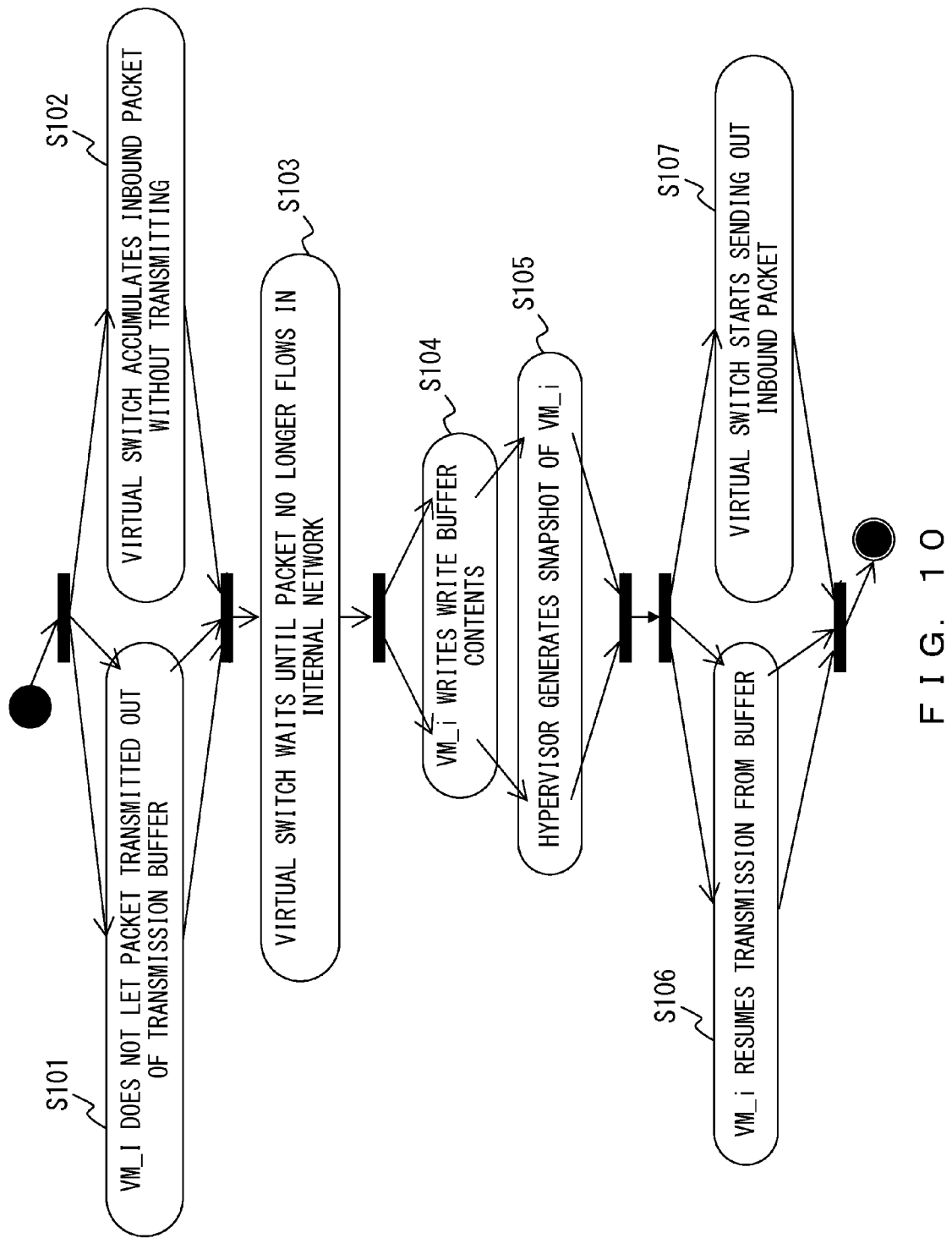
FIG. 10 is an activity diagram illustrating an example of the action in the virtual system when generating a snapshot in the embodiment.

FIG. 10 is an activity diagram illustrating an example of the action in the virtual system when generating a snapshot in the present embodiment. The activity diagram is made as a diagram in which a status is given to each individual request/response.

The generation of a snapshot of the virtual system when the operator wishes to change the setting of the system or to update an application is explained. Here, the spot where a plurality of arrows are drawn in parallel in the activity diagram indicates that instructions are issued in parallel across a plurality of virtual machines VM.

The hypervisor 32 gives an instruction to the virtual machine 41 and the virtual switch 42 in the virtual system for the preparation for generating a snapshot, through the HV cooperation apparatus 419.

Upon receiving the instruction from the hypervisor 32, the virtual machine VM_i performs control so as not to receive a packet newly from the transmission buffer of the network connection apparatus 418 (S101). Meanwhile, the virtual machine VM_i continues to perform the reception of the packet.

Upon receiving the instruction from the hypervisor 32, the virtual switch 42 accumulates the packet (inbound packet) entering the internal network 52 from the external network 55 in the buffer 53, without transmitting it to the internal network 52 (S102). The virtual switch 42 continues to allow passage of the packet transmitted/received within the internal network 52, and the packet (outbound packet) from the internal network 52 to the external network 55.

The virtual switch 42 waits until the packet no longer flows into the internal network 52 (S103). Here, for example, the virtual switch 42 waits for a prescribed period of time until the packet no longer flows into the internal network 52.

The hypervisor 32 gives an instruction to the virtual machine VM_i in the virtual system 51, through the HV cooperation apparatus 419, for writing information kept in the buffer to write into the disk for data 417 (write buffer). Based on this instruction, the virtual machine VM_i writes contents in the write buffer onto the disk for data 417 (S104). The process in S104 is for preventing the content of the write buffer from being written onto the disk for data 417 at the time of restoring the snapshot.

When the virtual machine VM_i makes a notification of the completion of the writing of the buffer through the HV cooperation apparatus 419, the hypervisor 32 generates a snapshot of the virtual machine VM_i (S105). The hypervisor 32 stores the generated snapshot into the disk (for example, the external storing unit 16) managed by the hypervisor 32. At this time, the hypervisor 32 updates a snapshot managing table 61 stored in the external storing unit 16. However, the disk for data 417 is excluded from the target of the snapshot. When the generation of the snapshot is completed for all the virtual machines, the hypervisor 32 gives an instruction to the virtual machine VM_i and the virtual switch 42 in the virtual system 51 for the termination of the generation.

Upon receiving the snapshot generation termination instruction from the hypervisor 32, the virtual machine VM_i resumes the transmission process from the transmission buffer using the network connection apparatus 418 (S106).

Upon receiving the snapshot generation termination instruction from the hypervisor 32, the virtual switch 42 sends out the inbound packets that have been accumulated in the buffer 53, and also sends out the subsequent inbound packets (S107).

While an example of the action of a single hypervisor 32 is illustrated above, in a case in which the system is built across a plurality of hypervisors, the generation of the snapshot for the entire system is also possible by cooperation between the hypervisors. For example, using a hypervisor managing program to make the hypervisors cooperate, the action timing of each hypervisor may be controlled to realize cooperation between the hypervisors.

Next, the discarding of the snapshot is explained. After the operator changes the setting or updates an application after the snapshot is created, when there is no problem, the generated snapshot may be discarded. The discarding of the snapshot may be realized by just discarding the snapshot in each virtual machine 41.

Here, after the operator changes the setting or updates an application after the snapshot is created, there may be a case in which bringing back to the snapshot is desired due to a certain trouble. However, when simply bringing back to the snapshot, there are problems described below.

First, there is a problem in which, when the restoring is done using the snapshot in a condition in which connection is established between the client and the server (virtual machine), neither the client nor the server is able to recognize the counterpart, that is, the request being processed is lost.

In addition, in order to process the request from the client, the server (virtual machine) releases the lock of the request, and writes this fact into management information of the file system. There is a problem in which, when restoring is done in this case, the lock of the request being released is not recorded in the restored management information, the request is in a condition without release (a deadlock condition), and it is impossible to process the request.

In addition, there is a problem in which, by bringing back to the condition at the time of the generation of the snapshot, the process that was being executed at the time of the generation of the snapshot may be re-executed.

Figure 11A:
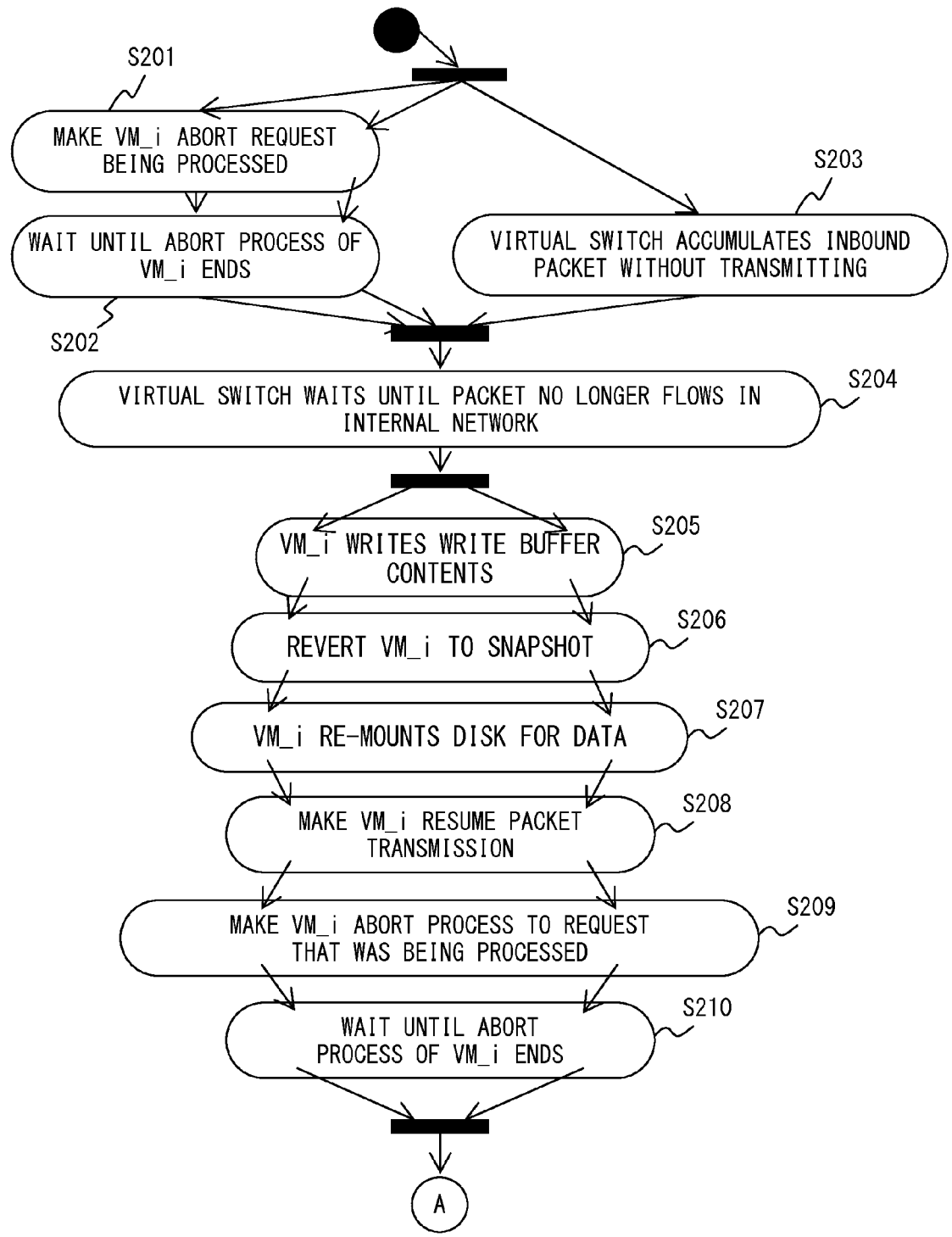
FIGS. 11A and 11B are an activity diagram illustrating an example of the action in the virtual system when restoring a snapshot in the embodiment.
Figure 11B:
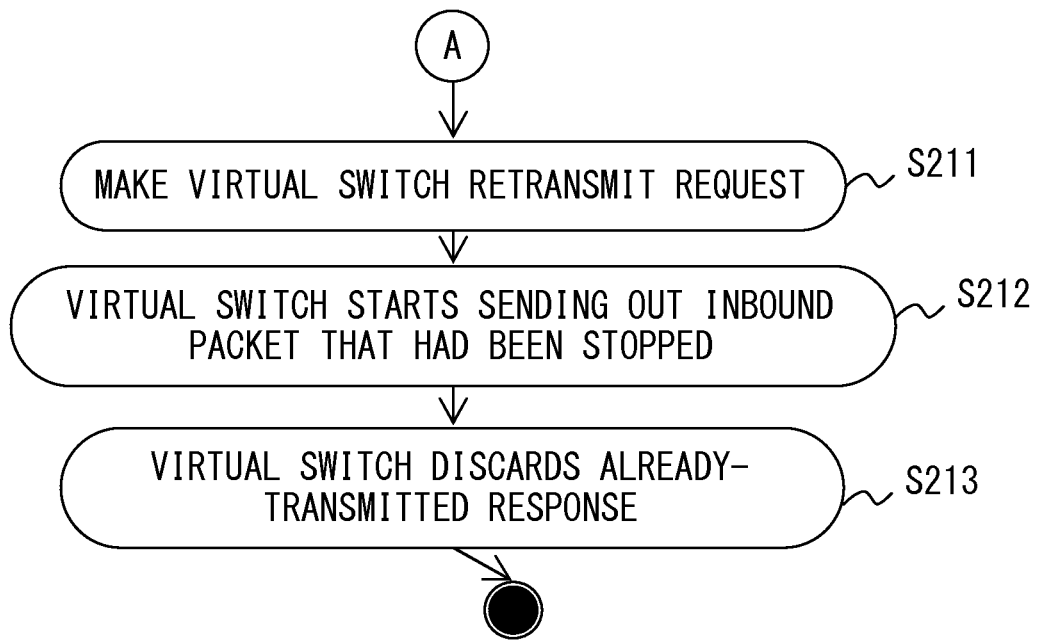

In order to handle these problems, when restoring the snapshot, the process in FIGS. 11A and 11B is performed.

FIGS. 11A and 11B are an activity diagram illustrating an example of the action in the virtual system when restoring a snapshot in the present embodiment. The activity diagram is made as a diagram in which a status is given to each individual request/response. Here, the spot where a plurality of arrows are drawn in parallel in the activity diagram indicates that instructions are issued in parallel across a plurality of virtual machines VM.

Based on the system snapshot ID for which an instruction has been given from the operator, the hypervisor 32 obtains the row having the system snapshot ID. The hypervisor 32 identifies each virtual machine 41 of the virtual system 51 to restore using the obtained row. The hypervisor 32 gives an instruction to the identified virtual machine 41 and the virtual switch 42 of the virtual system 51 for the preparation for generating a snapshot, through the HV cooperation apparatus 419.

Upon receiving the snapshot restoring instruction from the hypervisor 32, the virtual machine VM_i aborts the execution being carried out for the request (S201). The means of the abort may be, for example, making an interruption to the worker thread, and the like. For example, for a Java application, an exception may be generated in the thread in which the request is being processed, and the resource may be released by the finally block of the application.

The virtual machine VM_i waits until the abort process ends (S202). Since the inbound request no longer comes from the virtual switch 42, the abort process eventually ends.

Upon receiving the snapshot restoring instruction from the hypervisor 32, the virtual switch 42 accumulates the inbound packet entering the internal network 52 from the external network 55 in the buffer 53, without letting it flow into the internal network 52 (S203). The virtual switch 42 continues to allow passage of the packet within the internal network 52 only and the outbound packet from the internal network 52 to the external network 55.

The virtual switch 42 waits until the packet no longer flows into the internal network 52 (S204). Here, for example, the virtual switch 42 waits for a prescribed period of time until the packet no longer flows into the internal network 52.

The hypervisor 32 gives an instruction to the virtual machine VM_i in the virtual system 51, through the HV cooperation apparatus 419, for writing information kept in the buffer to write into the disk for data 417 (write buffer). Based on this instruction, the virtual machine VM_i writes contents in the write buffer onto the disk for data 417 (S205).

When the virtual machine VM_i makes a notification of the completion of the writing of the buffer through the HV cooperation apparatus 419, the hypervisor 32 performs restoring of the virtual machine VM_i to the snapshot (S206). However, since the disk for data 417 is excluded from the target of the snapshot, it remains in the condition before the restoring.

The content of the disk for data 417 may be different between the time of the generation of the snapshot and the time of the restoring of the snapshot, and the hypervisor 32 makes the virtual machine VM_i mount the disk for data 417 again, through the HV cooperation apparatus 419 (S207). Accordingly, information read out from the disk for data 417 and kept in the buffer (read buffer) may be discarded, and the integrity between the read buffer and the disk for data 417 may be maintained.

The virtual machine VM_i brought back to the condition of the snapshot is in the condition in which the packed is not sent out from the network connection apparatus 418. In this case, the hypervisor 32 makes the transmission from the transmission of the network connection apparatus 418 of the virtual machine VM_i resume, through the HV cooperation apparatus 419 (S208).

The virtual machine VM_i brought back to the status of the snapshot is still processing the request that was being executed in S105 at the point of time when the snapshot was created. Therefore, the hypervisor 32 aborts those processes in the same method as in S201 (S209).

The virtual machine VM_i waits until the abort process ends (S210). Since the inbound request no longer comes from the virtual switch 42, the abort process eventually ends.

The virtual switch 42 transmits a packet in which a packet header is attached to the request body in the request retransmission table 54 to the virtual machine VM_i again (S211).

The virtual switch 42 sends out the inbound packets that have been accumulated in the buffer 53, and also sends out the subsequent inbound packets to the internal network 52 (S212).

When the transmitted response length in the request retransmission table 54 is positive, the virtual switch 42 discards the packets regarding the response for the length corresponding to the response length, and sends back only the packets regarding the subsequent response to the client (S213).

While an example of the action of a single hypervisor 32 is illustrated above, in a case in which the system is built across a plurality of hypervisors, the generation of the snapshot for the entire system is also possible by cooperation between the hypervisors. For example, using a hypervisor managing program to make the hypervisors cooperate, the action timing of each hypervisor may be controlled to realize cooperation between the hypervisors.

Figure 12:
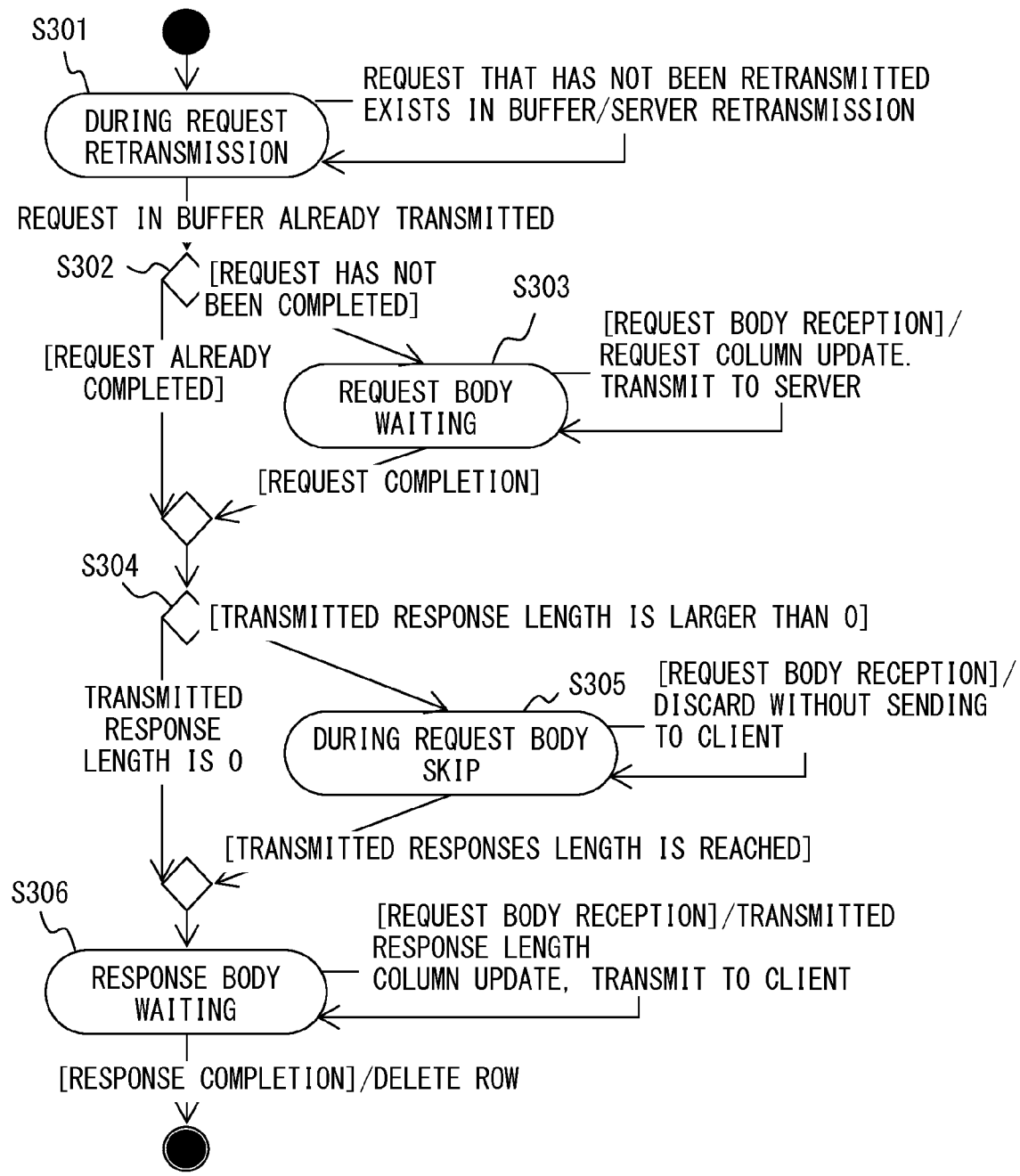
FIG. 12 is an activity diagram about request retransmission (S211 through S213) of a virtual switch at the time of restoring a snapshot in the embodiment.

FIG. 12 is an activity diagram about request retransmission (S211 through S213) of a virtual switch at the time of restoring a snapshot in the present embodiment. FIG. 12 is an activity diagram in which, compared with FIG. 9, the action statuses of "REQUEST RETRANSMISSION" and "DURING RESPONSE BODY SKIP" are added, and accordingly, branching is also added. In FIG. 12, the actions in S211 through S213 in FIG. 11B are explained specifically. Here, the explanation is made while providing an example of the status transition for each request ID in the request retransmission table 54 in FIG. 6.

First, the virtual switch 42 performs the retransmission of the packet regarding the request (S301). Here, in FIG. 6, in the example in which the request ID is "1", since there is no request in the "REQUEST" 54-2 in the request retransmission table 54, the process proceeds to S302 without any action.

Meanwhile, in FIG. 6, in the examples in which the request ID is "2", "3", "4", the request body saved in the "REQUEST" 54-2, that is, the buffer 53, includes a request body that has not been retransmitted. In this case, the virtual switch 42 retransmits the request saved in the "REQUEST" 54-2 to the server (virtual machine VM_i). Specifically, the virtual switch 42 generates a packet header regarding the request for retransmission, using the TRANSMISSION SOURCE" 54-4 and "TRANSMISSION DESTINATION" 54-5 included in the row of the request body of the transmission target. The virtual switch 42 attaches the generated header to each request body to create a packet, and retransmits the packet to the transmission destination.

In the conditional branching in S302, the branching is made according to whether or not the request of the request/response has been completed. In S302, in the examples in which the request ID is "3", "4" in FIG. 6, the reception of the request has been completed, and the process proceeds to S305.

In S302, in the case of the request ID "1", "2", the reception of the request has not been completed, and therefore, the process proceeds to S303, where the virtual switch 42 enters the waiting status for the request from the client (S303). Here, when a packet regarding the request is sent from the client, the virtual switch 42 saves the request body included in the packet in the request retransmission table 54, and also, transmits the packet to the server (virtual machine VM_i). When the reception of the request is completed, the process proceeds to S304.

In the conditional branching in S304, the branching is made according to the transmitted response length in the request retransmission table 54. In S304, in the examples in which the request ID is "1", "2" or "3" in FIG. 6, the transmitted response length is 0, and therefore, the process proceeds to S306. In S304, in the example in which the request ID is "4", the transmitted response length is larger than 0, and therefore, the process proceeds to S305.

In S305, a request has already been sent to the virtual machine VM_i, and therefore, a packet regarding the response to it comes back. However, since a part of the packets regarding the response was already sent to the client before the restoring of the status at the time of the generation of the snapshot, the virtual switch 42 discards the packets regarding the response up to the transmitted response length without sending them to the client.

When the virtual switch 42 receives a packet regarding a response exceeding the transmitted response length from virtual server 41, that is, when it receives a packet regarding a response that has not been sent to the client, the virtual switch 42 performs the following process. That is, the virtual switch 42 forwards, to the client, the packet regarding the response that has not been sent to the client. After forwarding all the packets regarding the response, the virtual switch 42 deletes the row regarding the response from the request retransmission table 54 (S306).

Next, a variation example of the present embodiment is explained.

FIG. 13 illustrates an example of a request transmission table in a variation example of the present embodiment. In the request retransmission table 54 in FIG. 6, there is a possibility that, the order of packets to retransmit is not fixed, and the response of the fourth row in FIG. 6 may differ due to the retransmission. In order to prevent it, as illustrated in FIG. 13, the time of transmission to the virtual machine (server) may be attached to each packet in the "REQUEST" 54-2a in the request retransmission table 54 as a time stamp, and at the time of retransmission, the retransmission may be done in the order of the time stamps. Alternatively, the time of the reception at the virtual switch may be attached to each packet in the "REQUEST" 54-2a in the request retransmission table 54 as a time stamp, and at the time of retransmission, the retransmission may be done in the order of the time stamps.

Specifically, in S001 in FIG. 9, when adding the request body to the value of the "REQUEST" 54-2, the virtual switch 42 attaches the time of the transmission to the virtual machine (server) 41 as a time stamp. Then, at the time of the retransmission of the request, in S211 in FIG. 11B, the virtual switch refers to the "REQUEST" 54-2 in the request retransmission table 54, and transmits the request to the virtual machine 41 again in the order of the time stamps.

According to the present embodiment, a mechanism to control the transmission of the network transmission buffer of the virtual machine from the hypervisor 32 is added to the HV cooperation apparatus 419. In addition, in response to the instruction from the hypervisor 32, the OS of the virtual machine 41 is able to determine whether or not to perform transmission of the packet from the transmission buffer. In the same manner, the buffer control of the virtual switch 42 may be performed by the hypervisor 32.

By performing the writing of the write buffer onto the disk for data 417 based on the instruction from the hypervisor 32, it becomes possible to provide conservation of the data. By re-mounting the disk for data 417 at the time of restoring from the snapshot, it becomes possible to discard the data in the read buffer. Based on the instruction from the hypervisor 32, the process being executed to the request is aborted. In addition, by transmitting the request from the virtual switch again after the restoring for obtaining the snapshot, it becomes possible to maintain the connection existing at the time of the restoring.

According to the present embodiment, even when a series of processes ranging from the processing of the request received from the client to the processing of the response to it has not been completed, that is, an uncompleted transition exists, the transaction may be resumed after the completion of the restoring of the virtual machine. In addition, the restoring of the snapshot for the entire system including a plurality of machines becomes possible without stopping the service. In addition, data updates made between the generation of the snapshot and the restoring may be maintained after the restoring.

According to an aspect of the present invention, even when an uncompleted transaction exists, the transaction may be resumed after the completion of the restoring of the virtual machine.

Meanwhile, the present embodiment is not limited to the embodiment described above, and may take various configurations or embodiments without departing the scope of the present embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process for resuming a transaction, the process comprising:
    making a virtual switch connected to a virtual machine forwarding a packet to the virtual machine when the packet addressed to the virtual machine is received;
    making the virtual switch store the received packet, the packet being related to an uncompleted transaction, in a first storing unit in association with the uncompleted transaction;
    making the virtual switch stop forwarding of the packet to the virtual machine in response to an instruction for restoring the virtual machine; and
    making the virtual switch transmitting one or a plurality of packets stored in the first storing unit in association with the uncompleted transaction to the virtual machine when an instruction to resume the forwarding in response to an completion of restoring of the virtual machine is received.

2. The non-transitory computer-readable recording medium according to claim 1, wherein when storing the packet in the first storing unit in association with the uncompleted transaction, the virtual switch attaches a time of reception or a time of forwarding of the packet to the packet.

3. The non-transitory computer-readable recording medium according to claim 1, the process further comprising:

making the virtual switch forward, upon receiving a packet regarding a response to a request to the virtual machine formed by the packet, the packet regarding the response;

making the virtual switch store a forwarded amount of the packet regarding the response in the first storing unit; and making the virtual switch discard one or more packets corresponding to the forwarded amount stored in the first storing unit, and forward one or more packets exceeding the forwarded amount when an instruction to resume the forwarding in response to a completion of restoring of the virtual machine is received, and when the packet regarding the response from the virtual machine is received.

4. The non-transitory computer-readable recording medium according to claim 1, the process further comprising:

making the virtual machine stop transmission of a packet regarding a response;

making the virtual machine write, into a second storing unit corresponding to a storing area used by the virtual machine, write-in information kept temporarily in the storing area before being written into the second storing unit; and making the virtual machine generate a snapshot of the virtual machine after a stop of forwarding of a packet regarding the request from the virtual switch to the virtual machine, a stop of transmission of the packet regarding the response from the virtual machine, and writing of the write-in information.

5. The non-transitory computer-readable recording medium according to claim 4, the process further comprising:

making the virtual machine corresponding to the snapshot stop a process being executed, when, after generation of the snapshot, transmission of the packet regarding the request and the packet regarding the response that had been stopped has resumed;

making the virtual machine write, into the second storing unit, write-in information kept temporarily in the storing area;

restoring the virtual machine corresponding to the snapshot, using the snapshot, after a stop of the process being executed by the virtual machine, a stop of forwarding of the packet regarding the request from the virtual switch to the virtual machine, and writing of the write-in information.

6. The non-transitory computer-readable recording medium according to claim 5, the process further comprising:

making the restored virtual machine discard read-out information read out from the second storing unit and kept temporarily;

making the restored virtual machine resume transmission of the packet regarding the response that was stopped at a time of generation of the snapshot; and making the restored virtual machine stop a process that was being performed at the time of generation of the snapshot.

7. An information processing apparatus comprising:
a processor that performs a process including:
making a virtual switch connected to a virtual machine forwarding a packet to the virtual machine when the packet addressed to the virtual machine is received;

making the virtual switch store the received packet, the packet being related to an uncompleted transaction, in a first storing unit in association with the uncompleted transaction;

making the virtual switch stop forwarding of the packet to the virtual machine in response to an instruction for restoring the virtual machine; and making the virtual switch transmit one or a plurality of packets stored in the first storing unit in association with the uncompleted transaction to the virtual machine when an instruction to resume the forwarding in response to a completion of restoring of the virtual machine.

8. The information processing apparatus according to claim 7, wherein when storing the packet in the first storing unit in association with the uncompleted transaction, the virtual switch attaches a time of reception or a time of forwarding of the packet to the packet.

9. The information processing apparatus according to claim 7, further wherein the process further includes:

making the virtual switch forward when the virtual switch receives a packet regarding a response to a request to the virtual machine formed by the packet; and making the virtual switch store a forwarded amount of the packet regarding the response in the first storing unit, making the virtual switch discard one or more packets corresponding to the forwarded amount stored in the first storing unit, and making the virtual switch forward one or more packets exceeding the forwarded amount when an instruction to resume the forwarding in response to a completion of restoring of the virtual machine is received, and when the packet regarding the response from the virtual machine is received.

10. The information processing apparatus according to claim 7, wherein the process further includes:

making the virtual machine stop transmission of a packet regarding the response, making the virtual machine write, into a second storing unit corresponding to a storing area used by the virtual machine, write-in information kept temporarily in the storing area before being written into the second storing unit; and making the virtual machine generate a snapshot of the virtual machine after a stop of forwarding of a packet regarding the request from the virtual switch to the virtual machine, a stop of transmission of the packet regarding the response from the virtual machine, and writing of the write-in information.

11. The information processing apparatus according to claim 10, wherein the process further includes:

restore the virtual machine corresponding to the snapshot, wherein making the virtual machine corresponding to the snapshot stop a process being executed, when, after generation of the snapshot, transmission of the packet regarding the request and the packet regarding the response that had been stopped has resumed, and making the virtual machine write, into the second storing unit, write-in information kept temporarily in the storing area; and restoring the virtual machine corresponding to the snapshot, using the snapshot, after a stop of the process being executed by the virtual machine, a stop of forwarding of the packet regarding the request from the virtual switch to the virtual machine, and writing of the write-in information.

12. The information processing apparatus according to claim 11, wherein the process further includes
   making the restored virtual machine discard read-out information read out from the second storing unit and kept temporarily,
   making the restored virtual machine resume transmission of the packet regarding the response that has been stopped at a time of generation of the snapshot, and
   making restored virtual machine stop a process that has been performed at the time of generation of the snapshot.

13. A transaction resuming method executed by an information processing apparatus, the transaction resuming method comprising:
   forwarding, upon receiving a packet addressed to the virtual machine, the packet to the virtual machine by using a virtual switch connected to a virtual machine;
   storing, by using the virtual switch, the received packet, the packet being related to an uncompleted transaction, in a first storing unit in association with the uncompleted transaction;
   stopping forwarding of the packet to the virtual machine by using the virtual switch in response to an instruction for restoring the virtual machine; and
   transmitting one or a plurality of packets stored in the first storing unit in association with the uncompleted transaction to the virtual machine by using the virtual switch when an instruction to resume the forwarding in response to an completion of restoring of the virtual machine is received.

14. The transaction resuming method according to claim 13, wherein
   when storing the packet in the first storing unit in association with the uncompleted transaction, the virtual switch attaches a time of reception or a time of forwarding of the packet to the packet.

15. The transaction resuming method according to claim 13, the transaction resuming method further comprising:
   forwarding, upon receiving a packet regarding a response to a request to the virtual machine formed by the packet, the packet regarding the response by using the virtual switch;
   storing a forwarded amount of the packet regarding the response in the first storing unit by using the virtual switch; and
   discarding packets corresponding to the forwarded amount stored in the first storing unit, and forwarding packets exceeding the forwarded amount by using the virtual switch when an instruction to resume the forwarding in response to a completion of restoring of the virtual machine is received, and when the packet regarding the response from the virtual machine is received.

* * * * *